(12) United States Patent
VanBlon et al.

(10) Patent No.: US 10,924,544 B2
(45) Date of Patent: Feb. 16, 2021

(54) APPARATUS, METHOD, AND PROGRAM PRODUCT FOR CALENDAR CONTROL

(71) Applicant: LENOVO (Singapore) PTE. LTD., New Tech Park (SG)

(72) Inventors: Russell Speight VanBlon, Raleigh, NC (US); John Carl Mese, Cary, NC (US); Nathan J. Peterson, Oxford, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 187 days.

(21) Appl. No.: 15/400,752

(22) Filed: Jan. 6, 2017

(65) Prior Publication Data
US 2018/0196590 A1    Jul. 12, 2018

(51) Int. Cl.
*H04L 29/08* (2006.01)
*G06Q 10/10* (2012.01)
*G06F 16/27* (2019.01)

(52) U.S. Cl.
CPC .......... *H04L 67/1095* (2013.01); *G06F 16/27* (2019.01); *G06Q 10/109* (2013.01); *G06Q 10/1095* (2013.01)

(58) Field of Classification Search
CPC .. G06F 3/04847; G06F 11/2064; G06F 16/27; H04L 67/1095; G06Q 10/109; G06Q 10/1095
See application file for complete search history.

(56) References Cited

U.S. PATENT DOCUMENTS

| | | | |
|---|---|---|---|
| 9,319,866 B2* | 4/2016 | Huslak | G06Q 10/10 |
| 2003/0014292 A1* | 1/2003 | Strubbe | G06Q 10/109 |
| | | | 702/178 |
| 2006/0015386 A1* | 1/2006 | Moore | G06Q 10/1095 |
| | | | 705/7.19 |
| 2008/0294798 A1* | 11/2008 | Lynch | H04M 1/72563 |
| | | | 709/248 |
| 2009/0217176 A1* | 8/2009 | Coulomb | G06Q 10/109 |
| | | | 715/751 |
| 2009/0248480 A1* | 10/2009 | Miksovsky | G06Q 10/1095 |
| | | | 705/7.19 |
| 2013/0325539 A1* | 12/2013 | Fritz | G06Q 10/063116 |
| | | | 705/7.16 |
| 2014/0059608 A1* | 2/2014 | Beattie, Jr. | H04N 21/45 |
| | | | 725/39 |
| 2016/0203442 A1* | 7/2016 | Pererira | G06Q 10/1095 |
| | | | 705/7.19 |
| 2017/0011353 A1* | 1/2017 | Weiner | G06Q 10/1095 |
| 2017/0124517 A1* | 5/2017 | Martin | G06Q 10/109 |
| 2018/0005160 A1* | 1/2018 | Johnson, III | A61B 5/4266 |

* cited by examiner

*Primary Examiner* — Justin R. Blaufeld
(74) *Attorney, Agent, or Firm* — Kunzler Bean & Adamson

(57) ABSTRACT

Apparatuses, methods, and program products are disclosed for calendar control. One apparatus includes a processor, and a memory that stores code executable by the processor. The code is executable by the processor to detect a triggering calendar entry of multiple calendar entries in a first digital calendar corresponding to a user. The triggering calendar entry occupies a time that is inconsistent with data corresponding to the first digital calendar. The code is executable by the processor to synchronize the triggering calendar entry with a second digital calendar corresponding to the user without synchronizing each calendar entry of the multiple calendar entries.

17 Claims, 6 Drawing Sheets

APPARATUS, METHOD, AND PROGRAM PRODUCT FOR CALENDAR CONTROL

FIELD

The subject matter disclosed herein relates to calendars and more particularly relates to calendar control.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for scheduling events using a calendar. Multiple different calendars for a user may be challenging to manage.

BRIEF SUMMARY

An apparatus for calendar control is disclosed. A method and computer program product also perform the functions of the apparatus. In one embodiment, the apparatus includes a processor, and a memory that stores code executable by the processor. The code, in various embodiments, is executable by the processor to detect a triggering calendar entry of multiple calendar entries in a first digital calendar corresponding to a user. In such embodiments, the triggering calendar entry occupies a time that is inconsistent with data corresponding to the first digital calendar. The code, in some embodiments, is executable by the processor to synchronize the triggering calendar entry with a second digital calendar corresponding to the user without synchronizing each calendar entry of the multiple calendar entries.

In some embodiments, the code executable by the processor detects that the triggering calendar entry is inconsistent with historical calendar entries in the first digital calendar. In one embodiment, the code executable by the processor detects that the triggering calendar entry is inconsistent with settings corresponding to the first digital calendar.

In another embodiment, the code executable by the processor notifies the user in response to the triggering calendar entry overlapping in time with a calendar entry of the second digital calendar. In some embodiments, the code executable by the processor detects that the triggering calendar entry occurs during a time selected from the group consisting of work time, home time, vacation time, meeting time, and eating time.

A method for calendar control, in one embodiment, includes detecting, by use of a processor, a triggering calendar entry of multiple calendar entries in a first digital calendar corresponding to a user. In such an embodiment, the triggering calendar entry occupies a time that is inconsistent with data corresponding to the first digital calendar. In a further embodiment, the method includes synchronizing the triggering calendar entry with a second digital calendar corresponding to the user without synchronizing each calendar entry of the multiple calendar entries.

In some embodiments, detecting the triggering calendar entry includes detecting that the triggering calendar entry is inconsistent with historical calendar entries in the first digital calendar. In various embodiments, detecting the triggering calendar entry includes detecting that the triggering calendar entry is inconsistent with settings corresponding to the first digital calendar. In one embodiment, the method includes notifying the user in response to the triggering calendar entry overlapping in time with a calendar entry of the second digital calendar.

In some embodiments, detecting the triggering calendar entry in the first digital calendar includes detecting the triggering calendar event in a work calendar, and synchronizing the triggering calendar entry with the second digital calendar includes synchronizing the triggering calendar entry with a personal calendar. In certain embodiments, detecting the triggering calendar entry in the first digital calendar includes detecting the triggering calendar event in a personal calendar, and synchronizing the triggering calendar entry with the second digital calendar includes synchronizing the triggering calendar entry with a work calendar. In various embodiments, detecting the triggering calendar entry includes detecting that the triggering calendar entry occurs during a time selected from the group consisting of work time, home time, vacation time, meeting time, and eating time. In one embodiment, the method includes detecting a setting that inhibits synchronizing the triggering calendar entry with the second digital calendar. In some embodiments, detecting the setting includes detecting a vacation setting.

In one embodiment, a program product includes a computer readable storage medium that stores code executable by a processor. The executable code, in certain embodiments, includes code to perform detecting a triggering calendar entry of multiple calendar entries in a first digital calendar corresponding to a user. In such embodiments, the triggering calendar entry occupies a time that is inconsistent with data corresponding to the first digital calendar. The executable code, in some embodiments, includes code to perform synchronizing the triggering calendar entry with a second digital calendar corresponding to the user without synchronizing each calendar entry of the multiple calendar entries.

In certain embodiments, the executable code includes code to perform detecting the triggering calendar event in a work calendar, and synchronizing the triggering calendar entry with a personal calendar. In some embodiments, the executable code includes code to perform detecting the triggering calendar event in a personal calendar, and synchronizing the triggering calendar entry with a work calendar. In various embodiments, the executable code includes code to perform detecting that the triggering calendar entry occurs during a time selected from the group consisting of work time, home time, vacation time, meeting time, and eating time.

In some embodiments, the executable code further includes code to perform detecting a setting that inhibits synchronizing the triggering calendar entry with the second digital calendar. In certain embodiments, the executable code further includes code to perform detecting a vacation setting that inhibits synchronizing the triggering calendar entry with the second digital calendar.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
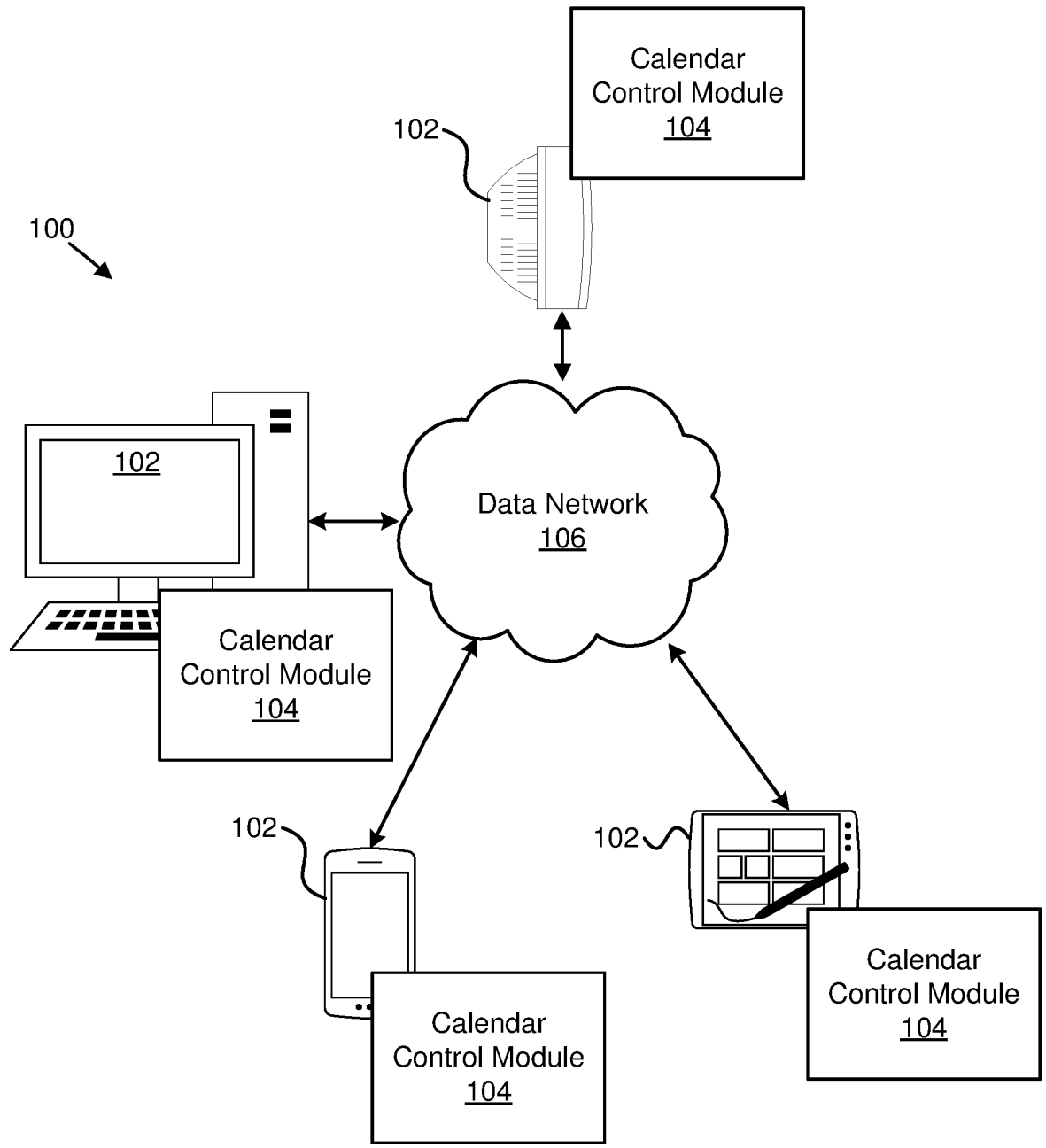
FIG. 1 is a schematic block diagram illustrating one embodiment of a system for calendar control.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for calendar control. In one embodiment, the system 100 includes information handling devices 102, calendar control modules 104, and data networks 106. Even though a specific number of information handling devices 102, calendar control modules 104, and data networks 106 are depicted in FIG. 1, one of skill in the art will recognize that any number of information handling devices 102, calendar control modules 104, and data networks 106 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), streaming devices, or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the calendar control module 104. In certain embodiments, the calendar control module 104 may detect a triggering calendar entry of multiple calendar entries in a first digital calendar corresponding to a user. In such embodiments, the triggering calendar entry may occupy a time that is inconsistent with data corresponding to the first digital calendar. The calendar control module 104 may synchronize the triggering calendar entry with a second digital calendar corresponding to the user without synchronizing each calendar entry of the multiple calendar entries. In this manner, the calendar control module 104 may be used for calendar control.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
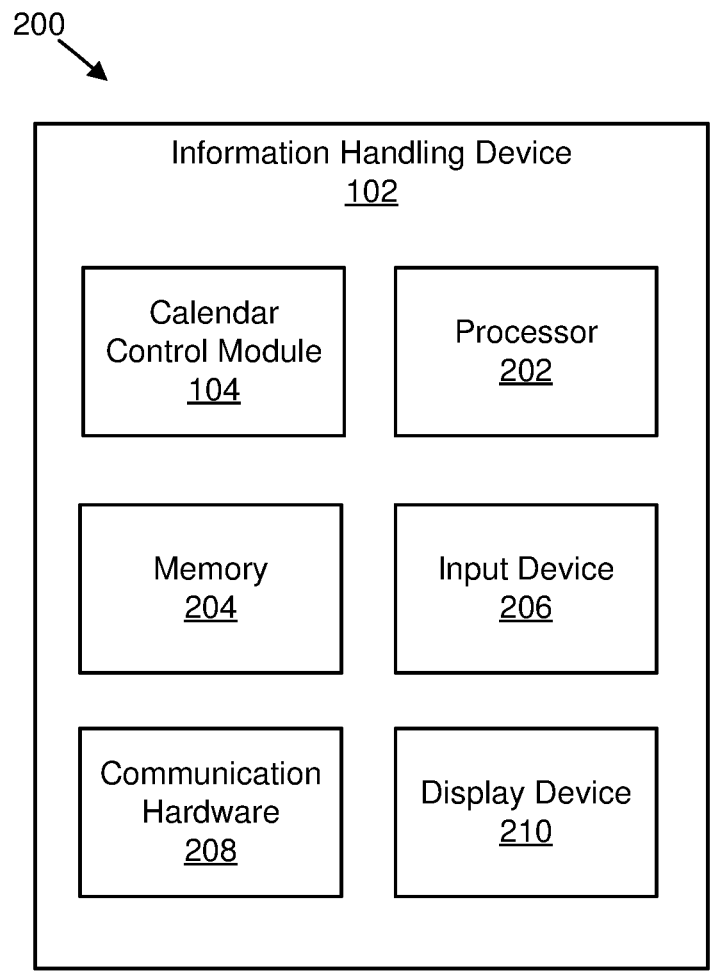
FIG. 2 is a schematic block diagram illustrating one embodiment of an apparatus including an information handling device.

FIG. 2 depicts one embodiment of an apparatus 200 that may be used for calendar control. The apparatus 200 includes one embodiment of the information handling device 102. Furthermore, the information handling device 102 may include the calendar control module 104, a processor 202, a memory 204, an input device 206, communication hardware 208, and a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the calendar control module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to calendar control. In some embodiments, the memory 204 also stores program code and related data, such as an operating system or other controller algorithms operating on the information handling device 102.

The information handling device 102 may use the calendar control module 104 for calendar control. As may be appreciated, the calendar control module 104 may include computer hardware, computer software, or a combination of both computer hardware and computer software. For example, the calendar control module 104 may include circuitry, or a processor, used to detect a triggering calendar entry of multiple calendar entries in a first digital calendar corresponding to a user. The triggering calendar entry may occupy a time that is inconsistent with data corresponding to the first digital calendar. As another example, the calendar control module 104 may include computer program code that synchronizes the triggering calendar entry with a second digital calendar corresponding to the user without synchronizing each calendar entry of the multiple calendar entries.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon selective calendar synchronization.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the calendar control module 104.

Figure 3:
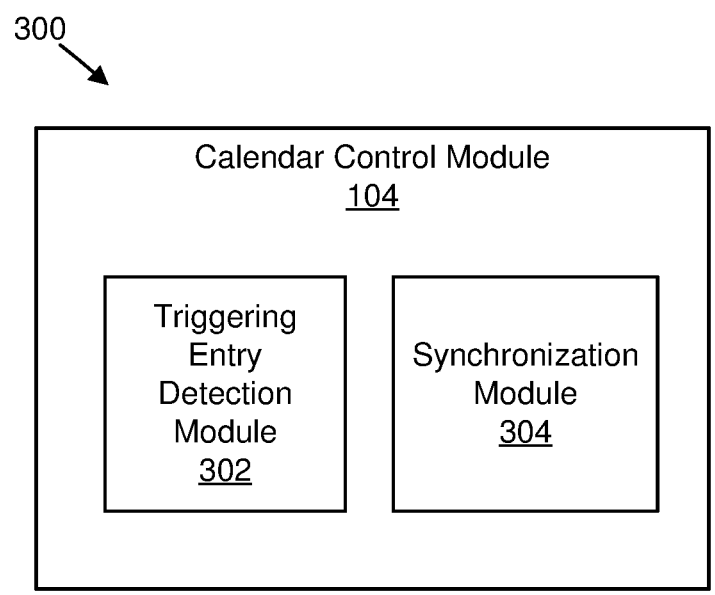
FIG. 3 is a schematic block diagram illustrating one embodiment of an apparatus including a calendar control module.

FIG. 3 depicts a schematic block diagram illustrating one embodiment of an apparatus 300 that includes one embodiment of the calendar control module 104. Furthermore, the calendar control module 104 includes a triggering entry detection module 302 and a synchronization module 304.

The triggering entry detection module 302 detects a triggering calendar entry out of multiple calendar entries in a first digital calendar corresponding to a user. The triggering calendar entry occupies a time that is inconsistent with data corresponding to the first digital calendar. For example, the triggering calendar entry may occur during work time, home time, vacation time, meeting time, and/or eating time.

In one embodiment, detecting the triggering calendar entry includes detecting that the triggering calendar entry is inconsistent with historical calendar entries in the first digital calendar. In certain embodiments, historical calendar entries may refer to calendar entries entered in the first digital calendar prior to entry of the triggering calendar entry. The historical calendar entries may establish a general pattern, such as entries entered within a specific time period (e.g., 8:00 am-5:00 pm, 5:00 pm-8:00 am, etc.). Using the general pattern, the triggering entry detection module 302 may detect whether the triggering calendar entry is inconsistent with the general pattern (e.g., whether the triggering calendar entry is outside of the specific time period).

In certain embodiments, the triggering entry detection module 302 may detect that the triggering calendar entry is inconsistent with settings corresponding to the first digital calendar. In some embodiments, the user may select one or more settings corresponding to the first digital calendar. The one or more settings may indicate a specific time period for standard calendar entries (e.g., a time period used during which calendar entries will not be detected as triggering calendar entries), a specific time period for non-standard calendar entries (e.g., a time period used during which calendar entries will be detected as triggering calendar entries), a type of calendar (e.g., work, personal, etc.), and so forth. Using the one or more settings, the triggering entry detection module 302 may detect whether a calendar entry is a triggering calendar entry.

In one embodiment, the synchronization module 304 synchronizes the triggering calendar entry with a second digital calendar corresponding to the user without synchronizing each calendar entry of the multiple calendar entries. For example, the synchronization module 304 may only synchronize the triggering calendar entry with the second digital calendar, and not synchronize all entries in the first digital calendar with the second digital calendar.

In some embodiments, synchronizing the triggering calendar entry with the second digital calendar includes copying the triggering calendar entry from the first digital calendar to the second digital calendar. In certain embodiments, synchronizing the triggering calendar entry with the second digital calendar includes making changes to the triggering calendar entry in the second digital calendar in response to changes made to the triggering calendar entry in the first digital calendar. In various embodiments, synchronizing the triggering calendar entry with the second digital calendar includes making changes to the triggering calendar entry in the first digital calendar in response to changes made to the triggering calendar entry in the second digital calendar.

In one embodiment, synchronizing the triggering calendar entry with the second digital calendar does not copy the triggering calendar entry from the first digital calendar to the second digital calendar, but does notify a user of the second digital calendar before and/or during occurrence of the triggering calendar entry. In some embodiments, synchronizing the triggering calendar entry with the second digital calendar does not copy the triggering calendar entry from the first digital calendar to the second digital calendar, but does notify a user of the second digital calendar if a calendar entry is entered in the second digital calendar that overlaps with the triggering calendar entry.

In certain embodiments, the calendar control module 104 may notify the user in response to the triggering calendar entry overlapping in time with a calendar entry of the second digital calendar. In various embodiments, the triggering entry detection module 302 may detect the triggering calendar event in a work calendar, and the synchronization module 304 may synchronize the triggering calendar entry with a personal calendar. In some embodiments, the triggering entry detection module 302 may detect the triggering calendar event in a personal calendar, and the synchronization module 304 may synchronize the triggering calendar entry with a work calendar.

Figure 4:
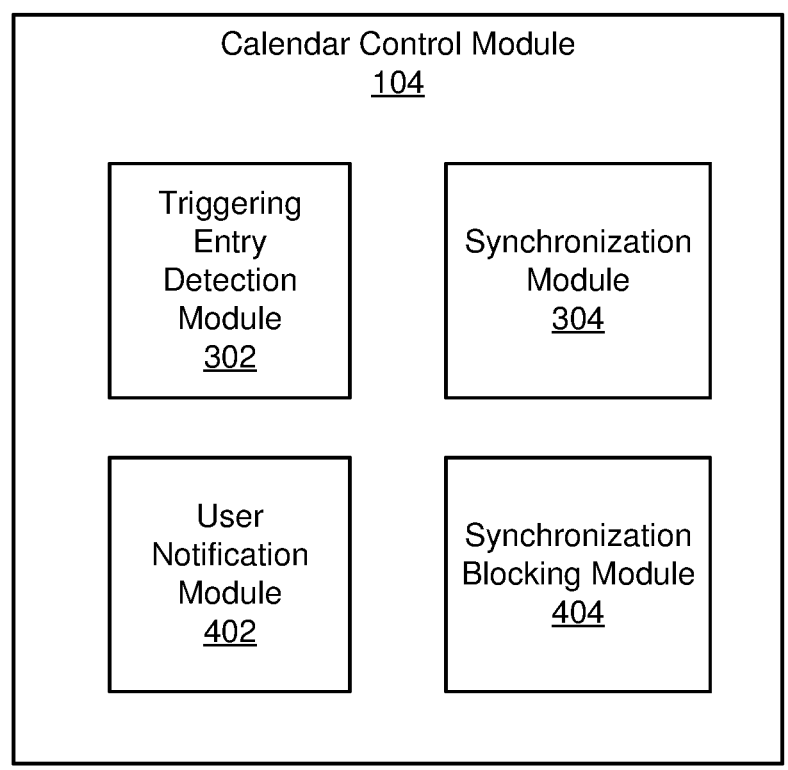
FIG. 4 is a schematic block diagram illustrating another embodiment of an apparatus including a calendar control module.

FIG. 4 is a schematic block diagram illustrating another embodiment of an apparatus 400 that includes one embodiment of the calendar control module 104. Furthermore, the calendar control module 104 includes one embodiment of the triggering entry detection module 302 and the synchronization module 304, that may be substantially similar to the triggering entry detection module 302 and the synchronization module 304 described in relation to FIG. 3. The calendar control module 104 also includes a user notification module 402 and a synchronization blocking module 404.

The user notification module 402 may notify the user in response to the triggering calendar entry overlapping in time with a calendar entry of the second digital calendar. For example, if the second digital calendar already has an existing calendar entry for a time from 1:00-3:00 pm on Oct. 24, 2020 and the triggering calendar entry is for a time from 2:00-2:30 pm on Oct. 24, 2020, the user notification module 402 may notify the user that the triggering calendar entry overlaps in time with the existing calendar entry. The user notification module 402 may notify the user by showing a message, showing a popup, showing an alert, sending an email, producing an audible alert, producing a tactile alert (e.g., vibration), or the like.

In some embodiments, the synchronization blocking module 404 detects a setting that inhibits synchronizing the triggering calendar entry with the second digital calendar. For example, the second digital calendar may have a vacation setting. Accordingly, in response to the synchronization module 304 attempting to synchronize the triggering calendar entry with the second digital calendar, the synchronization blocking module 404 may detect the vacation setting and may inhibit (e.g., block) synchronizing the triggering calendar entry with the second digital calendar.

Figure 5:
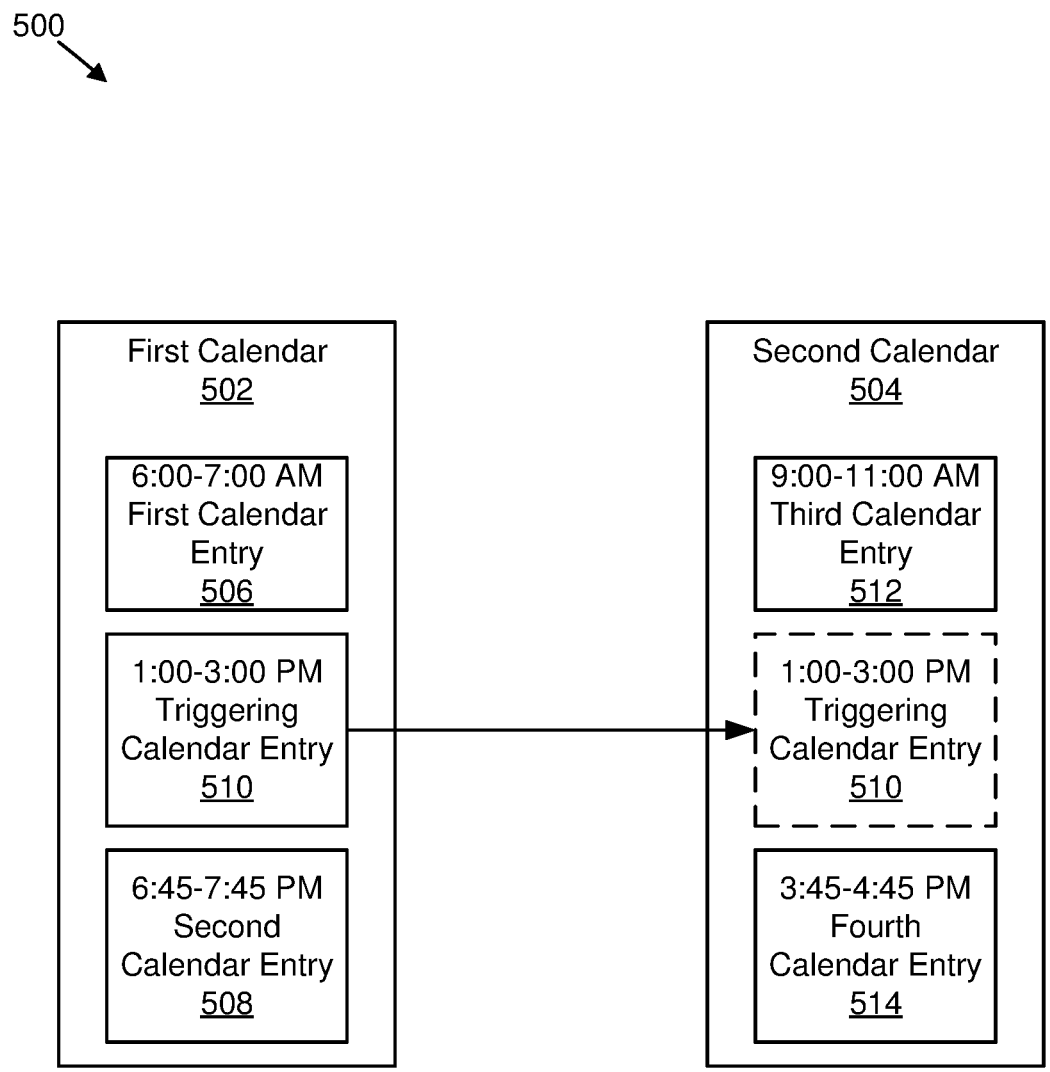
FIG. 5 is a schematic block diagram illustrating an embodiment of a method for calendar control.

FIG. 5 is a schematic block diagram illustrating an embodiment of a method 500 for calendar control. In some embodiments, the method 500 is performed by an apparatus, such as the information handling device 102. In other embodiments, the method 500 may be performed by a module, such as the calendar control module 104. In certain embodiments, the method 500 may be performed by a processor executing program code, for example, a microcontroller, a microprocessor, a CPU, a GPU, an auxiliary processing unit, a FPGA, or the like.

FIG. 5 illustrates a first calendar 502 and a second calendar 504. In one embodiment, the first calendar 502 may be a personal calendar, and the second calendar 504 may be a work calendar. The first calendar 502 includes a first calendar entry 506 that schedules a time from 6:00-7:00 am, and a second calendar entry 508 that schedules a time from 6:45-7:45 pm. In one embodiment, a user adds a triggering calendar entry 510 to the first calendar 502. In response to the triggering calendar entry 510 being placed on the personal calendar, the triggering calendar entry 510 is detected as being inconsistent with data corresponding to the first calendar 502. For example, in one embodiment, the first calendar entry 506 and the second calendar entry 508 are used to determine that the first calendar 502 is a personal calendar, and the triggering calendar entry 510 appears to be during a work time, thereby detecting that the triggering calendar entry 510 is inconsistent with data corresponding to the first calendar 502. As another example, in one embodiment, at least one user setting indicates that the first calendar 502 is a personal calendar and/or indicates times for normal calendar entries, and the triggering calendar entry 510 is inconsistent with the at least one user setting (e.g., data).

Accordingly, in response to detecting that the triggering calendar entry 510 is inconsistent with data corresponding to the first calendar 502, the method 500 synchronizes the triggering calendar entry 510 with the second calendar 504. As illustrated, the second calendar 504 includes a third calendar entry 512 that schedules a time from 9:00-11:00 am, and a fourth calendar entry 514 that schedules a time from 3:45-4:45 pm, as may appear on a work calendar.

Figure 6:
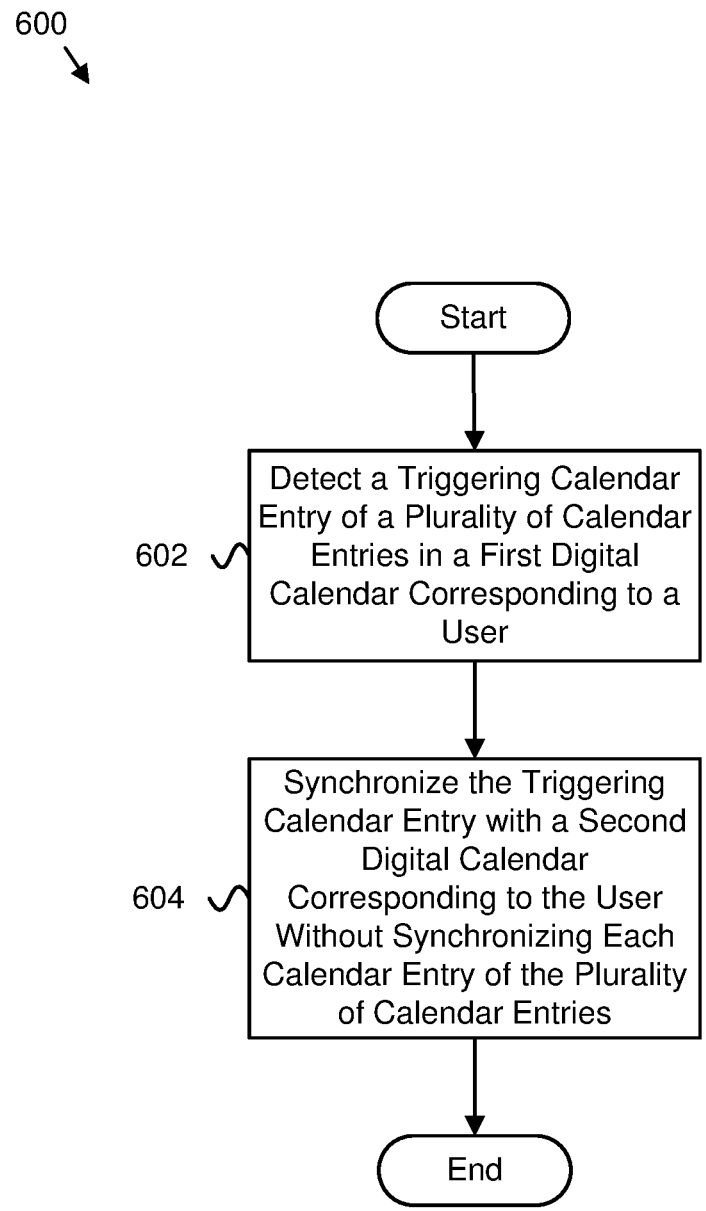
FIG. 6 is a schematic flow chart diagram illustrating an embodiment of a method for calendar control.

FIG. 6 is a schematic flow chart diagram illustrating an embodiment of a method 600 for calendar control. In some embodiments, the method 600 is performed by an apparatus, such as the information handling device 102. In other embodiments, the method 600 may be performed by a module, such as the calendar control module 104. In certain embodiments, the method 600 may be performed by a processor executing program code, for example, a microcontroller, a microprocessor, a CPU, a GPU, an auxiliary processing unit, a FPGA, or the like.

The method 600 may include detecting 602, by use of a processor, a triggering calendar entry of multiple calendar entries in a first digital calendar corresponding to a user. The triggering calendar entry may occupy a time that is inconsistent with data corresponding to the first digital calendar. In certain embodiments, the triggering entry detection module 302 may detect 602 the triggering calendar entry of the multiple calendar entries in the first digital calendar corresponding to the user.

In some embodiments, detecting 602 the triggering calendar entry includes detecting that the triggering calendar entry is inconsistent with historical calendar entries in the first digital calendar. In various embodiments, detecting 602 the triggering calendar entry includes detecting that the triggering calendar entry is inconsistent with settings corresponding to the first digital calendar. In certain embodiments, detecting 602 the triggering calendar entry includes detecting that the triggering calendar entry occurs during a time selected from the group including work time, home time, vacation time, meeting time, and/or eating time.

The method 600 may also include synchronizing 604 the triggering calendar entry with a second digital calendar corresponding to the user without synchronizing each calendar entry of the multiple calendar entries, and the method 600 may end. In certain embodiments, the synchronization module 304 may synchronize 604 the triggering calendar entry with the second digital calendar corresponding to the user without synchronizing each calendar entry of the multiple calendar entries.

In certain embodiments, detecting 602 the triggering calendar entry in the first digital calendar includes detecting the triggering calendar event in a work calendar, and synchronizing 604 the triggering calendar entry with the second digital calendar includes synchronizing the triggering calendar entry with a personal calendar. In one embodiment, detecting 602 the triggering calendar entry in the first digital calendar includes detecting the triggering calendar event in a personal calendar, and synchronizing 604 the triggering calendar entry with the second digital calendar includes synchronizing the triggering calendar entry with a work calendar.

In some embodiments, the method 600 includes notifying the user in response to the triggering calendar entry overlapping in time with a calendar entry of the second digital calendar. In various embodiments, the method 600 includes detecting a setting that inhibits synchronizing the triggering calendar entry with the second digital calendar. In such embodiments, detecting the setting may include detecting a vacation setting.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   detect a triggering calendar entry of a plurality of calendar entries in a first digital calendar corresponding to a first user of the first digital calendar;
   determine a pattern of the first digital calendar based on historical calendar entries in the first digital calendar, wherein the historical calendar entries comprise multiple separately entered calendar entries that do not overlap in time;
   determine whether the triggering calendar entry is inconsistent with the pattern of the first digital calendar, wherein the triggering calendar entry occupies a time that is inconsistent with data corresponding to the first digital calendar; and
   attempt to synchronize the triggering calendar entry with a second digital calendar corresponding to the first user of the first digital calendar without synchronizing each calendar entry of the plurality of calendar entries in response to detecting the triggering calendar entry, wherein, as a result of attempting to synchronize the triggering calendar entry with the second digital calendar not comprising copying the triggering calendar entry to the second digital calendar:
      notify a second user of the second digital calendar during occurrence of the triggering calendar entry, wherein the second user of the second digital calendar is notified by showing a popup, showing an alert, sending an email, producing an audible alert, or producing a tactile alert.

2. The apparatus of claim 1, wherein the code executable by the processor determines that the triggering calendar entry is inconsistent with settings corresponding to the first digital calendar.

3. The apparatus of claim 1, wherein the code executable by the processor notifies the second user of the second digital calendar in response to the triggering calendar entry overlapping in time with a calendar entry of the second digital calendar.

4. The apparatus of claim 1, wherein the code executable by the processor detects that the triggering calendar entry occurs during a time selected from the group consisting of work time, home time, vacation time, meeting time, and eating time.

5. A method comprising:
   detecting, by use of a processor, a triggering calendar entry of a plurality of calendar entries in a first digital calendar corresponding to a first user of the first digital calendar;
   determining a pattern of the first digital calendar based on historical calendar entries in the first digital calendar, wherein the historical calendar entries comprise multiple separately entered calendar entries that do not overlap in time;
   determining whether the triggering calendar entry is inconsistent with the pattern of the first digital calendar, wherein the triggering calendar entry occupies a time that is inconsistent with data corresponding to the first digital calendar; and
   attempting to synchronize the triggering calendar entry with a second digital calendar corresponding to the first user of the first digital calendar without synchronizing each calendar entry of the plurality of calendar entries in response to detecting the triggering calendar entry, wherein, as a result of attempting to synchronize the triggering calendar entry with the second digital calendar not comprising copying the triggering calendar entry to the second digital calendar:
      notifying a second user of the second digital calendar during occurrence of the triggering calendar entry, wherein the second user of the second digital calendar is notified by showing a popup, showing an alert, sending an email, producing an audible alert, or producing a tactile alert.

6. The method of claim 5, wherein determining the triggering calendar entry comprises determining that the triggering calendar entry is inconsistent with settings corresponding to the first digital calendar.

7. The method of claim 5, wherein detecting the triggering calendar entry in the first digital calendar comprises detecting the triggering calendar event in a work calendar, and attempting to synchronize the triggering calendar entry with the second digital calendar comprises attempting to synchronize the triggering calendar entry with a personal calendar.

8. The method of claim 5, wherein detecting the triggering calendar entry in the first digital calendar comprises detecting the triggering calendar event in a personal calendar, and attempting to synchronize the triggering calendar entry with the second digital calendar comprises attempting to synchronize the triggering calendar entry with a work calendar.

9. The method of claim 5, wherein detecting the triggering calendar entry comprises detecting that the triggering calendar entry occurs during a time selected from the group consisting of work time, home time, vacation time, meeting time, and eating time.

10. The method of claim 5, further comprising detecting a setting that inhibits synchronizing the triggering calendar entry with the second digital calendar.

11. The method of claim 10, wherein detecting the setting comprises detecting a vacation setting.

12. A program product comprising a computer readable storage medium that stores code executable by a processor, the executable code comprising code to perform:
  detecting a triggering calendar entry of a plurality of calendar entries in a first digital calendar corresponding to a first user of the first digital calendar;
  determining a pattern of the first digital calendar based on historical calendar entries in the first digital calendar, wherein the historical calendar entries comprise multiple separately entered calendar entries that do not overlap in time;
  determining whether the triggering calendar entry is inconsistent with the pattern of the first digital calendar, wherein the triggering calendar entry occupies a time that is inconsistent with data corresponding to the first digital calendar; and
  attempting to synchronize the triggering calendar entry with a second digital calendar corresponding to the first user of the first digital calendar without synchronizing each calendar entry of the plurality of calendar entries in response to detecting the triggering calendar entry, wherein, as a result of attempting to synchronize the triggering calendar entry with the second digital calendar not comprising copying the triggering calendar entry to the second digital calendar:
    notifying a second user of the second digital calendar during occurrence of the triggering calendar entry, wherein the second user of the second digital calendar is notified by showing a popup, showing an alert, sending an email, producing an audible alert, or producing a tactile alert.

13. The program product of claim 12, wherein the executable code further comprises code to perform detecting the triggering calendar event in a work calendar, and attempting to synchronize the triggering calendar entry with a personal calendar.

14. The program product of claim 12, wherein the executable code further comprises code to perform detecting the triggering calendar event in a personal calendar, and attempting to synchronize the triggering calendar entry with a work calendar.

15. The program product of claim 12, wherein the executable code further comprises code to perform detecting that the triggering calendar entry occurs during a time selected from the group consisting of work time, home time, vacation time, meeting time, and eating time.

16. The program product of claim 12, wherein the executable code further comprises code to perform detecting a setting that inhibits synchronizing the triggering calendar entry with the second digital calendar.

17. The program product of claim 12, wherein the executable code further comprises code to perform detecting a vacation setting that inhibits synchronizing the triggering calendar entry with the second digital calendar.

* * * * *